(12) United States Patent
Huang

(10) Patent No.: US 8,151,839 B2
(45) Date of Patent: Apr. 10, 2012

(54) DEVICE OF DOUBLE SAW BLADES

(75) Inventor: Liang Huang, Zhuji (CN)

(73) Assignee: Hammer Electric Power Tools Co., Ltd., Zhuji, Zhejiang Province (CN)

( * ) Notice: Subject to any disclaimer, the term of this patent is extended or adjusted under 35 U.S.C. 154(b) by 235 days.

(21) Appl. No.: 12/652,749

(22) Filed: Jan. 6, 2010

(65) Prior Publication Data
US 2011/0162494 A1 Jul. 7, 2011

(51) Int. Cl.
B27C 1/00 (2006.01)
B27G 13/08 (2006.01)

(52) U.S. Cl. ........................ 144/218; 144/237
(58) Field of Classification Search .................. 144/218, 144/222, 231–233, 237; 30/369; 125/13.01
See application file for complete search history.

(56) References Cited

U.S. PATENT DOCUMENTS

| 110,123 | A | * | 12/1870 | Dill | 144/218 |
| 817,568 | A | * | 4/1906 | Huther | 144/222 |
| 974,234 | A | * | 11/1910 | Burke | 144/237 |
| 1,033,380 | A | * | 7/1912 | Burke | 144/237 |
| 4,589,458 | A | * | 5/1986 | McCord, Jr. | 144/238 |

* cited by examiner

Primary Examiner — Shelley Self

(57) ABSTRACT

A device of double saw blades includes a first saw blade, a second saw blade, a driving device and security system. The first saw blade and the second saw blade rotate around a rotation axis oppositely, and respectively include a blade body and a cutting element mounting on a periphery of the blade body. The driving device connects with the first saw blade and the second saw blade, and has a driving diameter. The security system has a security distance provided between the blade bodies. The security system includes two rigidity enhancers. The rigidity enhancers respectively include a saw blade adapter mounting on an outer side of the blade bodies. The saw blade adapters respectively have a predetermined diameter to enhance a rigidity of the blade bodies, so as to reduce deformation thereof when working. The diameters are no more than the driving diameter.

17 Claims, 4 Drawing Sheets

DEVICE OF DOUBLE SAW BLADES

BACKGROUND OF THE PRESENT INVENTION

1. Field of Invention

The present invention relates to a device of double saw blades, which has two saw blades rotating oppositely along the same axis and respectively having a cutting element mounting on the periphery thereof, and more particularly to a device of double saw blades which is capable of reducing abrasion and collision between the two saw blades, so that the double saw blades have long service life and high efficiency.

2. Description of Related Arts

The devices of double saw blades which rotate oppositely along the same axis are applied widely due to the advantages such as fast cutting and stable working. However, the devices have some common drawbacks. When working, because of its fast rotation and pressure by the object being cut, abrasion and collision often happens between the two saw blades, especially at their peripheries. Accordingly, the saw blades may be damaged, even worse, there may be flying fragments to hurt people. Besides, a gap is ordinarily remained between the two saw blades for not blocking rotation of each other. Nonetheless, the gap brings noise, and the sawdust can entered the gap easily. As a result, abrasion between the two saw blades is increased, and the saw blades may even be deformed under pressure of the sawdust.

Additionally, the devices of double saw blades are ordinarily driven by shaft. The shaft mounts on the center of the devices of double saw blades via an adapter. Traditionally, the adapter is only used to fix and fasten the saw blades, and therefore does not need large size. For example, with regard to the saw blade having diameter of 125-165 mm, the diameter of the adapter is ordinarily 25 mm, which is much smaller than the diameter of the driving device. Accordingly, cutting depth is determined by the distance between the saw teeth and the driving device. Referring to FIG. 6, according to a conventional device of double saw blades, the diameter of the adapter is D, the diameter of the driving device is d, and the cutting depth is h.

To reduce abrasion and collision between the two saw blades, traditional methods comprise: increasing the distance between the two saw blades, or arranging a spacing member between the two saw blades.

If increasing the distance between the two saw blades, the cutting efficiency will be reduced, and the sawdust will enter into the gap between the two saw blades easily. Someone increases the distance between the two saw blades by respectively cutting the two opposite inner walls of the two saw blades, but the stress on the two saw blades is also increased, too, and therefore the saw blades are easier to be deformed.

The spacing member arranged between the two saw blades can prevent direct abrasion and collision between the two saw blades, but the spacing member still rubs with the two saw blades continuously and generates a great deal of heat. As a result, the heat and the abrasion causes that the saw blades using spacing member ordinarily have life of only few hours.

SUMMARY OF THE PRESENT INVENTION

An object of the present invention is to provide a device of double saw blades, which is capable of effectively reducing abrasion and collision between the two saw blades without spacing member, so that the device of double saw blade have long service life and high efficiency.

Another object of the present invention is to provide a device of double saw blades, which enhances the rigidity of the two saw blades without decreasing cutting depth thereof, so as to reduce abrasion and collision between the two saw blades.

Another object of the present invention is to provide a device of double saw blades, which has optimized rigidity to maintain the distance between the two saw blades in a predetermined level without external spacing member, so as to reduce abrasion and collision, and extend the service life thereof.

Another object of the present invention is to provide a device of double saw blades, which does not involve complicated structure or high executing cost to achieve the above objects, so the device of double saw blades reduces abrasion and collision between the two saw blades to extend the service life thereof, is highly operable and widely applicable.

Another object of the present invention is to provide a method of reducing abrasion and collision between two saw blades of a device of double saw blades, which maintains the distance between the two saw blades in a predetermined level, so as to extend the service life thereof, and provide high stability and efficiency.

Accordingly, in order to accomplish the above objects, the present invention provides a device of double saw blades, comprising:

a first saw blade rotating around an rotation axis in a first direction, comprising a first blade body and a first cutting element mounting on a periphery of the first blade body;

a second saw blade rotating around the rotation axis in a second direction, wherein the second direction is opposite to the first direction, comprising a second blade body and a second cutting element mounting on a periphery of the second blade body, wherein the second saw blade is parallel and close to the first saw blade to make the first cutting element and the second cutting element cut cooperatively;

a driving device connecting with the first saw blade and the second saw blade axially to drive, having a driving diameter; and a security system, has a security distance of 0.01-0.05 mm provided between the first blade body and the second blade body, comprising: a first rigidity enhancer comprising a first saw adapter mounting on an outer side of the first blade body, and a second rigidity enhancer comprising a second saw adapter mounting on an outer side of the second blade body, wherein the first saw adapter has a predetermined first diameter to enhance rigidity of the first blade body, the second saw adapter has a predetermined second diameter to enhance rigidity of the second blade body, so as to reduce deformation of the first blade body and the second blade body in working, and thus reduce abrasion and collision between the first blade body and the second blade body, wherein the first diameter and the second diameter are determined by the security distance, and are no more than the driving diameter.

Therefore, with the foregoing structure, the first saw adapter and the second saw adapter can be enlarged to the driving diameter to enhance the rigidity of the first blade body and the second blade body, meanwhile, a cutting depth of the device of double saw blades is determined by the driving diameter, so enhancing the rigidity of the first blade body and the second blade body does not cause decreasing the cutting depth.

These and other objectives, features, and advantages of the present invention will become apparent from the following detailed description, the accompanying drawings, and the appended claims.

DETAILED DESCRIPTION OF THE PREFERRED EMBODIMENT

Figure 1:
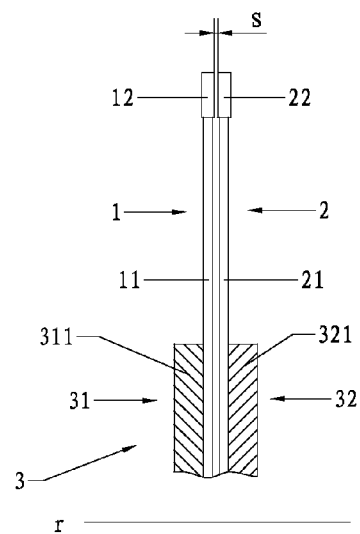
FIG. 1 is a partial sectional view of a device of double saw blades according to a preferred embodiment of the present invention.
Figure 2:
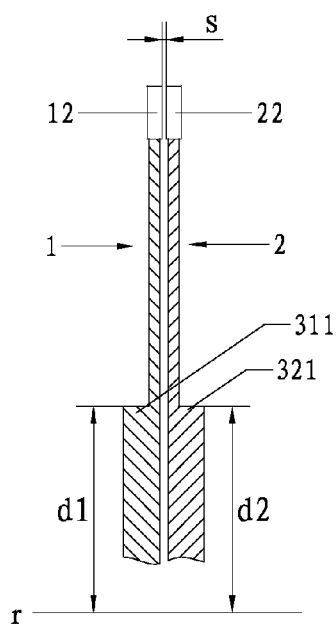
FIG. 2 is a partial sectional view of the device of double saw blades according to another preferred embodiment of the present invention.

Referring to FIG. 1-2 of the drawings, a device of double saw blades according to a preferred embodiment of the present invention is illustrated, comprising a first saw blade 1, a second saw blade 2, a driving device 4 and a security system 3.

The first saw blade 1 rotates around a rotation axis r in a first direction, and comprises a first blade body 11 and a first cutting element 12 mounting on a periphery of the first blade body 11.

The second saw blade 2 rotates around the rotation axis r in a second direction opposite to the first direction, and comprises a second blade body 21 and a second cutting element 22 mounting on a periphery of the second blade body 21. The second saw blade 2 is parallel with and close to the first saw blade 1 to make the first cutting element 12 and the second cutting element 22 cut cooperatively.

The driving device 4 connects with the first saw blade 1 and the second saw blade 2 to drive, and has a driving diameter d.

The security system 3 has a security distance s provided between the first blade body 11 and the second blade body 21. The security system 3 comprises a first rigidity enhancer 31. The first rigidity enhancer 31 comprises a first saw blade adapter 311 mounting on an outer side of the first blade body 11. The first saw blade adapter 311 has a predetermined first diameter d1 to enhance a rigidity of the first blade body 11, so as to reduce deformation thereof when working. The first diameter d1 is no more than the driving diameter d.

Figure 5:
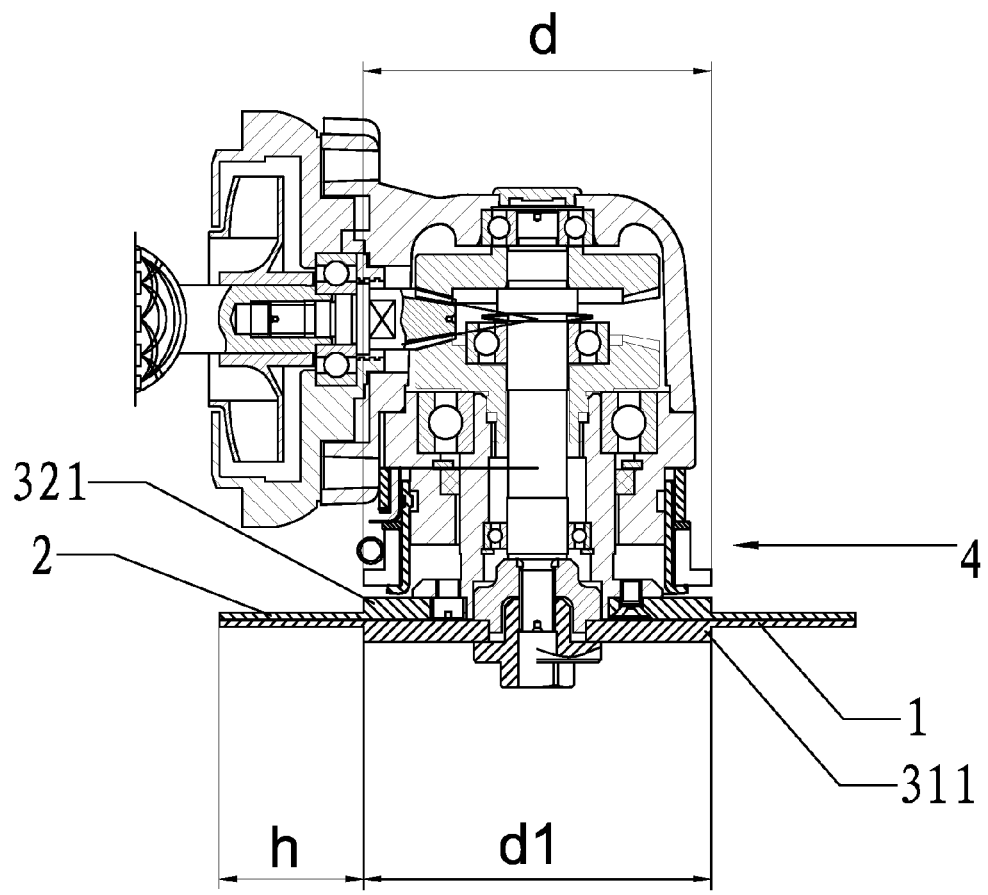
FIG. 5 is a side sectional view of the device of double saw blades according to a preferred embodiment of the present invention.
Figure 6:
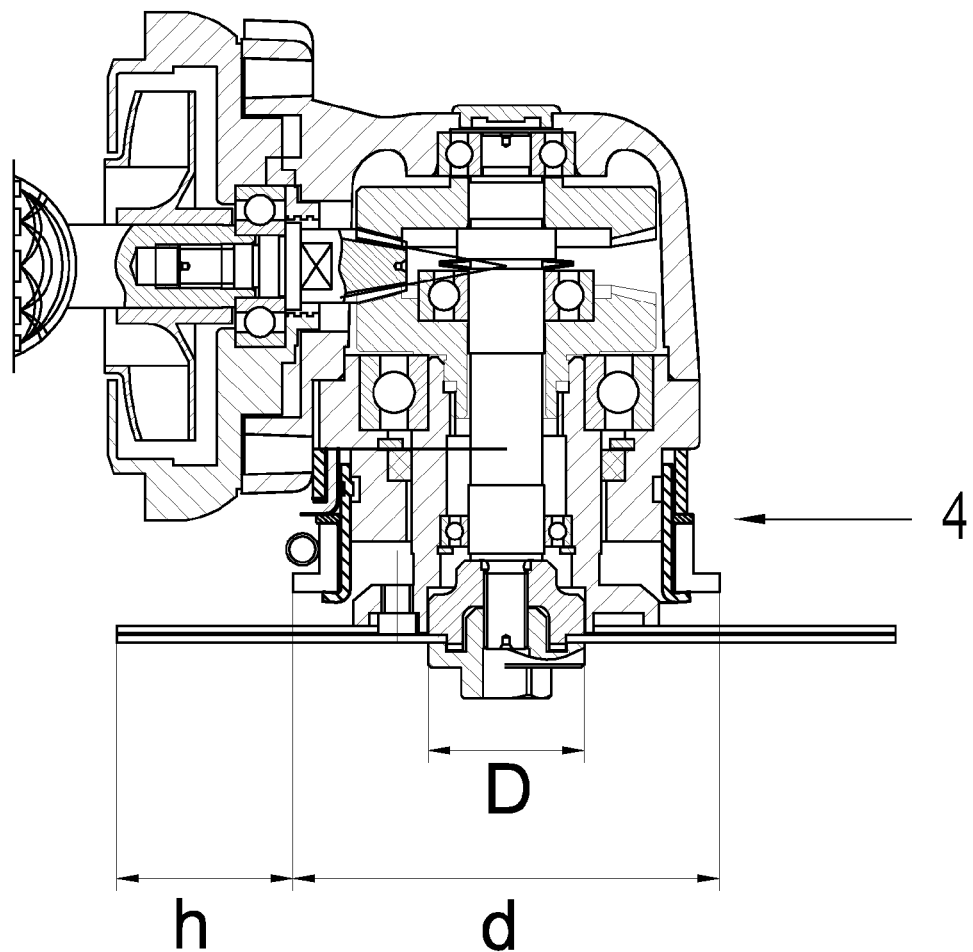
FIG. 6 is a side sectional view of a device of double saw blades according to the prior art.

Referring to FIG. 5, with the foregoing structure, when the device of double saw blades cuts, a cutting area is between the first cutting element 12 and the driving device 4, i.e., a cutting depth h is determined by the driving diameter d. The first diameter d1 can be set within a range no more than the driving diameter d. The larger the first diameter d1 is, the higher the rigidity of the first blade body 11 is. The cutting depth h of the device of double saw blades is not decreased by the first diameter d1.

To persons skilled in the art, it is obvious that in practice the first diameter d1 may be slightly larger than the driving diameter d because of manufacture or assembly. And when the first diameter d1 is slightly larger than the driving diameter d, the technical effect is not decreased evidently, and therefore is included in the present invention.

Preferably, the security system 3 further comprises a second rigidity enhancer 32. The second rigidity enhancer 32 comprises a second saw blade adapter 321 mounting on an outer side of the second blade body 21. The second saw blade adapter 321 has a predetermined second diameter d2 to enhance rigidity of the second blade body 21, so as to reduce deformation thereof when working. The second diameter d2 is no more than the driving diameter d. More preferably, the first diameter d1 and the second diameter d2 are equal to the driving diameter d, so as to maximally enhance the rigidity of the first blade body 11 and the second blade body 21 without decreasing the cutting depth h. The expression "equal to" herein should not be understood as strictly identical in numerical value, but comprises slight change and adjustment when ensuring the technical effect.

Particularly, referring to FIG. 5, according to a preferred embodiment of the present invention, the driving device 4 can adopts various conventional ways to drive the first saw blade 1 and the second saw blade 2. According to the present invention, the first diameter d1 and the second diameter d2 are no more than the driving diameter d to sufficiently make use of the driving diameter d, so as to enhance the rigidity of the first blade body 11 and the second blade body 21 without decreasing the cutting depth h of the device of double saw blades.

According to a preferred embodiment of the present invention, diameters of the first saw blade 1 and the second saw blade 2 are 125 mm, the driving diameter d is 60 mm, the first diameter d1 and the second diameter d2 are 60 mm. According to another preferred embodiment of the present invention, the diameters of the first saw blade 1 and the second saw blade 2 are 165 mm, the driving diameter d is 76 mm, the first diameter d1 and the second diameter d2 are 76 mm.

According to a preferred embodiment of the present invention, the first saw blade adapter 311 and the second saw blade adapter 321 can be mounted on the first blade body 11 and the second blade body 21 respectively by means of laser welding or riveting, and preferably, forming integratively with the first blade body 11 and the second blade body 21 respectively. To persons skilled in the art, it is obvious that mounting means is not limited to the above.

According to a preferred embodiment of the present invention, the security distance is 0.01-0.05 mm. The security distance s does not only reduce abrasion and collision between the first saw blade 1 and the second saw blade 2 when working to extend the service life thereof, but also decreases sawdust entering into a gap between the first saw blade 1 and the second saw blade 2, so as to make the first cutting element 12 and the second cutting element 22 work cooperatively in an optimal manner. If the security distance s is too small, the first saw blade 1 and the second saw blade 2 are not spaced effectively. If the security distance s is too large, too much sawdust may enter into the gap between the first saw blade 1 and the second saw blade 2 to decrease service life of the device of double saw blades, and disturb cooperative working of the first cutting element 12 and the second cutting element 22.

It is worth mentioning that, when providing the security distance s to effectively reduce abrasion and collision between the first saw blade 1 and the second saw blade 2, especially between the first cutting element 12 and the second cutting element 22, the predetermined first diameter d1 and second diameter d2 can not be increased unlimitedly. Increasing the first diameter d1 or the second diameter d2 can increase the rigidity of the first blade body 11 or the second blade body 21, so as to reduce abrasion and collision between the first saw blade 1 and the second saw blade 2 with the security distance s. However, if the first diameter d1 and the second diameter d2 are arranged too large, weight of the security system 3 will be increased improperly to disturb working of the device of double saw blades and increase manufacture cost. Preferably, the first diameter d1 and the second diameter d2 is as small as possible when rigidity enhancing effect is ensured. Additionally, for not decreasing the cutting depth h of the device of double saw blades, the first diameter d1 and the second diameter d2 are no more than the driving diameter d.

Further, the first saw blade adapter 311 and the second saw blade adapter 321 can be other shapes comprising but not limited to a wedge has a gradually smaller thickness towards the first cutting element 12 and the second cutting element 22, and size and strength thereof is for reducing abrasion and collision between the first saw blade 1 and the second saw blade 2. The service life of the device of double saw blades is extended by enhance the rigidity of the first saw blade 1 and the second saw blade 2.

Figure 3:
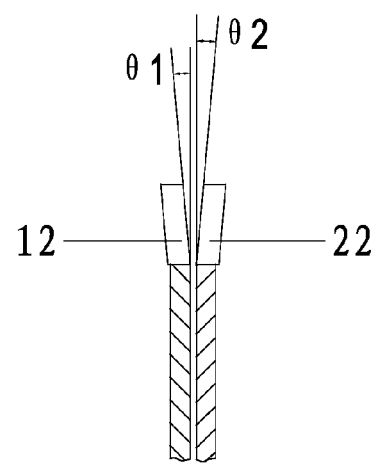
FIG. 3 is a partial sectional view of a first saw blade and a second saw blade of the device of double saw blades according to a preferred embodiment of the present invention, illustrating that the first cutting element and the second cutting element respectively incline outwardly.

Referring to FIG. 3, according to a preferred embodiment of the present invention, the first cutting element 12 inclines outwardly for a first security angle θ1, the second cutting element 22 inclines outwardly for a second security angle θ2, so as to further prevent the first cutting element 12 and the second cutting element 22 from being damaged by hitting on each other. Because when rotating, periphery portions of the first blade body 11 and the second blade body 21 have larger deformation than central portions thereof, the first cutting element 12 and the second cutting element 22 are more likely to have abrasion and collision. Additionally, the first cutting element 12 and the second cutting element 22 are generally hard due to responsibility of cutting, so if collision happens, there may be flying fragments hurting people. Preferably, the first security angle θ1 is equal to the second security angle θ2 to facilitate manufacture and assembly, and more preferably, is 1°-3°.

Figure 4:
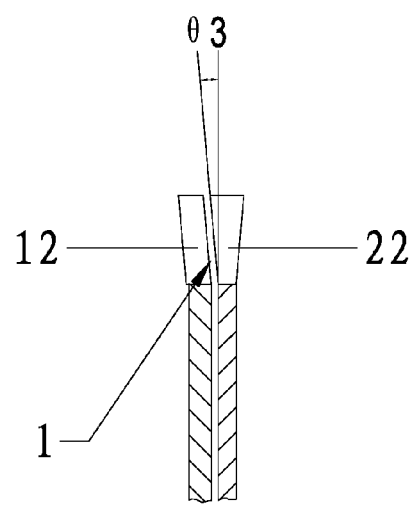
FIG. 4 is a partial sectional view of the first saw blade and the second saw blade of the device of double saw blades according to another preferred embodiment of the present invention, illustrating that the first cutting element inclines outwardly and an inner wall of the second cutting element biases to an inner wall of the first cutting element.

Referring to FIG. 4, further, the first cutting element 12 inclines outwardly for the first security angle θ1, an inner wall of the second cutting element 22 inclines to an opposite inner wall of the first cutting element 12 for a third security angle θ3. Preferably, the first security angle θθ1 is larger than the third security angle θ3. More preferably, the first security angle θ1 is equal to the third security angle θ3, the inner wall of the first cutting element 12 is parallel to the inner wall of second cutting element 22, so as to maintain the security distance s between the first cutting element 12 and the second cutting element 22, and define a bending gap 1 to prevent the sawdust from entering into the gap between the first saw blade 1 and the second saw blade 2. Because the first cutting element 12 and the second cutting element 22 incline, rigidity in the periphery portions thereof is enhanced, and the first cutting element 12 and the second cutting element 22 are less likely to hit each other. Particularly, in the structure described above, the second cutting element 22 is larger as comparing to simply inclining outwardly, and has higher strength to reduce collision with the first cutting element 12 by deformation.

According to another preferred embodiment of the present invention, the first cutting element 12 inclines outwardly for the first security angle θ1, the second cutting element 22 inclines towards the first cutting element 12 for the third security angle θ3. Preferably, the first security angle θ1 is larger than the third security angle θ3. More preferably, the first security angle θ1 is equal to the third security angle θ3, the inner wall of the first cutting element 12 is parallel to the inner wall of second cutting element 22, so as to maintain the security distance s between the first cutting element 12 and the second cutting element 22, and define the bending gap 1 to prevent the sawdust from entering into the gap between the first saw blade 1 and the second saw blade 2. It is worth mentioning that in the structure described above, weight of the first cutting element 12 or the second cutting element 22 is not increased evidently.

The present invention provides a method of reducing abrasion and collision between a first saw blade 1 and a second saw blade 2 of a device of double saw blades, comprising:

providing a security distance s between the first saw blade 1 and the second saw blade 2; and enhancing rigidity of the first saw blade 1 and the second saw blade 2 to reduce abrasion and collision therebetween.

Further, enhancing rigidity of the first saw blade 1 and the second saw blade 2 comprises: mounting a first saw blade adapter 311 on an outer side of the first saw blade 1, which has a predetermined first diameter d1 to enhance the rigidity of the first saw blade 1; and mounting a second saw blade adapter 321 on an outer side of the second saw blade 2, which has a predetermined second diameter d2 to enhance the rigidity of the second saw blade 2.

Preferably, the first diameter d1 and the second diameter d2 are no more than a driving diameter d of a driving device 4 to avoid decreasing a cutting depth h of the device of double saw blades.

More preferably, the first diameter d1 and the second diameter d2 are equal to the driving diameter d, so as to maximally enhance the rigidity of the first blade body 11 and the second blade body 21 without decreasing the cutting depth h.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A device of double saw blades, comprising:
a first saw blade rotating around an rotation axis in a first direction, comprising a first blade body and a first cutting element mounting on a periphery of said first blade body;
a second saw blade rotating around said rotation axis in a second direction, wherein said second direction is opposite to said first direction, comprising a second blade body and a second cutting element mounting on a periphery of said second blade body, wherein said second saw blade is parallel and close to said first saw blade to make said first cutting element and said second cutting element cut cooperatively;
a driving device connecting with said first saw blade and said second saw blade axially to drive, having a driving diameter; and
a security system, has a security distance provided between said first blade body and said second blade body, comprising: a first rigidity enhancer comprising a first saw adapter mounting on an outer side of said first blade body, wherein said first saw adapter has a predetermined first diameter to enhance rigidity of said first blade body, so as to reduce deformation of said first blade body in working, wherein said first diameter is no more than said driving diameter, and a second rigidity enhancer comprising a second saw adapter mounting on an outer side of said second blade body, wherein said second saw adapter has a predetermined second diameter to enhance rigidity of said second blade body, so as to reduce deformation of said second blade body in working, wherein said second diameter is no more than said driving diameter.

2. The device of double saw blades, as recited in claim 1, wherein said first diameter and said second diameter are equal to said driving diameter, so as to maximally enhance said rigidity of said first blade body and said second blade body without decreasing a cutting depth of said device of double saw blades.

3. The device of double saw blades, as recited in claim 1, wherein said first cutting element inclines outwardly for a first security angle, and said second cutting element inclines outwardly for a second security angle, so as to further reduce possibility of collision between said first cutting element and said second cutting element.

4. The device of double saw blades, as recited in claim 2, wherein said first cutting element inclines outwardly for a first security angle, and said second cutting element inclines outwardly for a second security angle, so as to further reduce possibility of collision between said first cutting element and said second cutting element.

5. The device of double saw blades, as recited in claim 3, wherein an inner wall of said second cutting element inclines towards an inner wall of said first cutting element for a third security angle to define a bending gap therebetween for preventing sawdust from entering into a gap between said first saw blade and said second saw blade.

6. The device of double saw blades, as recited in claim 4, wherein an inner wall of said second cutting element inclines towards an inner wall of said first cutting element for a third security angle to define a bending gap therebetween for preventing sawdust from entering into a gap between said first saw blade and said second saw blade.

7. The device of double saw blades, as recited in claim 3, wherein said first security angle is equal to said second security angle, and is 1°-3°.

8. The device of double saw blades, as recited in claim 4, wherein said first security angle is equal to said second security angle, and is 1°-3°.

9. The device of double saw blades, as recited in claim 5, wherein said first security angle is equal to said second security angle, and is 1°-3°.

10. The device of double saw blades, as recited in claim 6, wherein said first security angle is equal to said second security angle, and is 1°-3°.

11. The device of double saw blades, as recited in claim 1, wherein said first cutting element inclines outwardly for a first security angle, said second cutting element inclines towards said first cutting element for a third security angle to define a bending gap therebetween for preventing sawdust from entering into a gap between said first saw blade and said second saw blade.

12. The device of double saw blades, as recited in claim 2, wherein said first cutting element inclines outwardly for a first security angle, said second cutting element inclines towards said first cutting element for a third security angle to define a bending gap therebetween for preventing sawdust from entering into a gap between said first saw blade and said second saw blade.

13. The device of double saw blades, as recited in claim 5, wherein said first security angle is not less than said third security angle to maintain said security distance between said first cutting element and said second cutting element.

14. The device of double saw blades, as recited in claim 6, wherein said first security angle is not less than said third security angle to maintain said security distance between said first cutting element and said second cutting element.

15. The device of double saw blades, as recited in claim 10, wherein said first security angle is not less than said third security angle to maintain said security distance between said first cutting element and said second cutting element.

16. The device of double saw blades, as recited in claim 11, wherein said first security angle is not less than said third security angle to maintain said security distance between said first cutting element and said second cutting element.

17. The device of double saw blades, as recited in claim 12, wherein said first security angle is not less than said third security angle to maintain said security distance between said first cutting element and said second cutting element.

\* \* \* \* \*